United States Patent [19]
Maeda

[11] Patent Number: 5,439,620
[45] Date of Patent: Aug. 8, 1995

[54] LIQUID DISTRIBUTOR TO BE USED IN SUBSTANCE AND/OR HEAT EXCHANGING

[75] Inventor: Yutaka Maeda, Yokohama, Japan

[73] Assignee: Mitsubishi Corporation, Tokyo, Japan; a part interest

[21] Appl. No.: 180,656

[22] Filed: Jan. 12, 1994

[51] Int. Cl.6 .............................................. B01F 3/04
[52] U.S. Cl. ........................ 261/97; 261/DIG. 44; 239/193
[58] Field of Search ............. 261/DIG. 44, 97, 112.2; 239/193

[56] References Cited

U.S. PATENT DOCUMENTS

| | | | |
|---|---|---|---|
| 2,168,997 | 8/1939 | Lankes et al. | 239/193 |
| 2,497,947 | 2/1950 | Lewis | 261/106 |
| 2,616,670 | 11/1952 | Molen | 239/193 |
| 2,688,771 | 9/1954 | Jandacek | 239/193 |
| 3,006,623 | 10/1961 | Ross et al. | 261/97 |
| 3,286,999 | 11/1966 | Takeda | 261/112.2 |
| 4,264,538 | 4/1981 | Moore et al. | 261/DIG. 44 |
| 4,479,909 | 10/1984 | Streuber | 261/DIG. 44 |
| 4,855,089 | 8/1989 | Michels | 261/97 |
| 5,269,465 | 12/1993 | Zich et al. | 261/DIG. 44 |

FOREIGN PATENT DOCUMENTS

| | | | |
|---|---|---|---|
| 0328786 | 2/1988 | European Pat. Off. | |
| 979677 | 12/1950 | France | 261/97 |
| 2945103 | 5/1987 | Germany | 261/97 |
| 63-243689 | 3/1988 | Japan | |
| 1129631 | 10/1968 | United Kingdom | |
| 1129632 | 10/1968 | United Kingdom | |
| 2163063 | 2/1986 | United Kingdom | 239/193 |

*Primary Examiner*—Tim R. Miles
*Attorney, Agent, or Firm*—Frishauf, Holtz, Goodman & Woodward

[57] ABSTRACT

A liquid distributor for use in substance and/or heat exchanging tower for effecting uniform liquid distribution. The liquid distributor distributes and supplies a liquid to be treated from an upper part of the inside of the tower to the whole area of the tower through distributing tubes. The distributing tubes are provided along the lateral axis of the tower, and the tubes have at least one nozzle hole provided on the upper side thereof. A sheet-like material is fixed on the surface of the distributing tube at a position lower than the nozzle hole in such a manner that the sheet-like material contacts the surface of the distributing tube, extends in the axial direction of the distributing tube and is spaced apart from the distributing tube at the lower end of the sheet-like material. The sheet-like material has zigzag notches formed on the lower end thereof. The side part of the distributing tube located lower than the nozzle and/or the upper part of the sheet-like material have a surface which is inclined in a direction crossing with the axis of the distributing tube.

19 Claims, 4 Drawing Sheets

LIQUID DISTRIBUTOR TO BE USED IN SUBSTANCE AND/OR HEAT EXCHANGING

BACKGROUND OF THE INVENTION

1. Field of the Invention

The present invention relates to a liquid distributor to be used in a substance and/or heat exchanging tower. The liquid distributor is a device which is used in a tower in which a counter-flow of a liquid and a gas is effected and thereby the liquid and the gas come into contact with each other, and which is used for uniformly distributing a liquid onto a structure packed in the inside of the tower, a so-called packing.

2. Prior Art

There are many kinds of liquid distributors conventionally used in a substance and/or heat exchanging tower which vary in their methods of distribution. One conventional distributor comprises a plurality of liquid distributing tubes placed in parallel along the lateral axis of a tower, the distributing tubes having opening nozzle holes at intervals along the lower part thereof. In the distributing tube of this type, the liquid falls on the packing from the nozzle holes and the liquid is distributed onto the packing at the position of the nozzle holes. The distributing tubes are connected to a main tube provided also in parallel to the lateral axis of the tower, and the main tube is connected to a longitudinal tube provided in parallel to the longitudinal axis of the tower. The amount of liquid flowing from the nozzle holes depends on the head of liquid accumulating in the longitudinal tube, the diameter of the nozzle and the number of nozzles. Among these parameters, it is the head that changes when the distributor is used. The flow of the liquid changes depending on the change in the head. When the head is high, a flow velocity increases; on the other hand, when the head is low, a flow velocity is reduced. Due to this change in flow velocity, nozzle holes are generally opened in a vertically downward direction on the distributing tube so that the direction of a flow and the distributing position do not change. If the diameter of a nozzle and the number of nozzles are determined on the basis of the case of a large amount of flow, the liquid readily flows out from the nozzle holes near the longitudinal tube when the amount of flow is small, and thereby it becomes difficult to distribute the liquid uniformly.

The amount of a liquid to be distributed in a substance and/or heat exchanging tower varies according to the operation conditions of the tower. When the amount of liquid to be distributed increases or decreases largely at the time of an operation, such a distributor as mentioned above which is provided nozzle holes at intervals on the lower part thereof is not effective.

Another type of distributor is a so-called overflow type which comprises distributing tubes formed in a U-shaped trough. In this type of distributor, a liquid to be distributed is overflowed from a notch of the upper end of the U-shaped trough; such a distributor however occupies a larger area of the tower due to its construction, which may cause pressure loss of a rising gas at the time of operation.

There is another type of distributor which comprises guide pins provided on the notches guiding a liquid downwardly under capillary action and letting the liquid fall from the lower end of the pin, to accomplish uniform liquid distribution. However the cost thereof is very high. In a distributor of this kind, in order to effect uniform overflow of a liquid, it is necessary for the upper end surface of the distributor to be kept horizontal. This results in difficulties in its provision in a tower.

Moreover, in such a type of distributor, it is also necessary to prevent waves from occurring in the surface of a liquid so as to enable uniform overflow of the liquid. However, it is technically difficult to remove waves. When an amount of a liquid to be distributed is large and a flow velocity is high, it is difficult to prevent waves from occurring.

As another method there is known a method according to Japanese Patent Application No. 45991/1988 (corresponding to Japanese Patent Publication (Kokai) No. 63-243689), which comprises providing openings in the side-wall of a distributing tube formed in a U-shaped trough, letting a liquid flow out from the openings, strike a guide wall and spread as a result. According to this method, however, a considerable velocity must be imparted to the outflowing liquid, and hence the method is not applicable to slow flowing liquids.

SUMMARY OF THE INVENTION

The present inventor has made extensive studies in order to overcome the defects of the prior art as mentioned above. As a result, he has found that the uniform distribution of a liquid can be improved remarkably by providing a nozzle hole on the upper part of a distributing tube, fixing a sheet-like material on the surface of the distributing tube lower than the nozzle hole, and providing, in the side part of the distributing tube located lower than the nozzle and/or the upper part of the sheet-like material, a surface which is inclined in a direction crossing with the axis of the distributing tube or which is horizontal.

A first embodiment of the present invention relates to a liquid distributor to be used in a substance and/or heat exchanging tower, which distributes and supplies a liquid to be treated from the upper part of the inside of the substance and/or heat exchanging tower to the whole area of said tower through distributing tubes, in which the distributing tube provided along the lateral axis of said tower has at least one nozzle hole provided on the upper side thereof; a sheet-like material is fixed on the surface of the distributing tube at a position lower than said nozzle hole in such a manner that it comes into contact with the surface of said distributing tube, extends in the axis direction of the distributing tube and is spaced apart from the distributing tube at the lower end thereof, said sheet-like material having zigzag notches formed on the lower end thereof; and the side part of the distributing tube located lower than the nozzle and/or the upper part of the sheet-like material have a surface which is inclined in a direction crossing with the axis of the distributing tube or is horizontal.

A second embodiment of the present invention relates to a liquid distributor to be used in a substance and/or heat exchanging tower, which distributes and supplies a liquid to be treated from the upper part of the inside of the substance and/or heat exchanging tower to the whole area of said tower through distributing tubes, in which the distributing tube provided along the lateral axis of said tower has at least one nozzle hole provided in the upper side thereof; a sheet-like material is fixed on the surface of the distributing tube at a position lower than said nozzle hole in such a manner that it comes into contact with the surface of said distributing tube, extends in the axis direction of the distributing tube and is spaced apart from the distributing tube at the lower end thereof, said sheet-like material having liquid-ramifying plates formed on the lower end thereof, which are opened in opposite directions in series or a number at a time in the direction crossing with the axis of the distributing tube; and the side part of the distributing tube located lower than the nozzle and/or the upper part of the sheet-like material have a surface which is inclined in a direction crossing with the axis of the distributing tube.

BRIEF DESCRIPTION OF THE DRAWINGS

FIG. 1a is a perspective view of the liquid distributor according to the present invention; FIG. 1b is an enlarged view of the distributing tube in the liquid distributor according to the present invention; FIGS. 1c and 1d are cross-sectional views of the distributing tubes of two embodiments of the liquid distributor according to the present invention;

DETAILED DESCRIPTION OF THE INVENTION

Figure 1A:
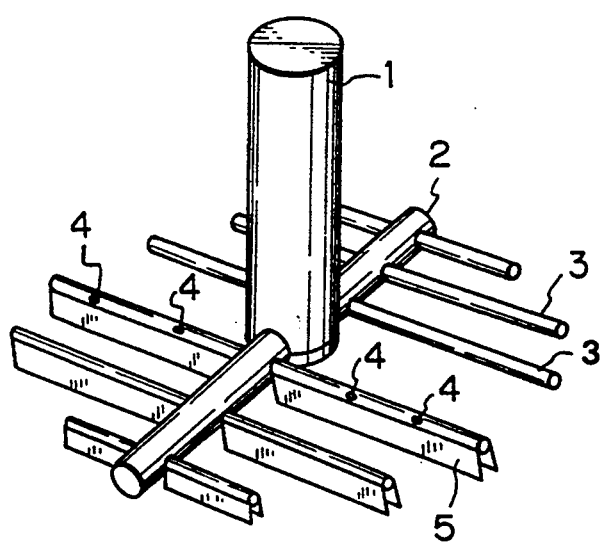
FIGS. 1a through 1d are diagrams showing the liquid distributor according to the present invention.
Figure 1B:
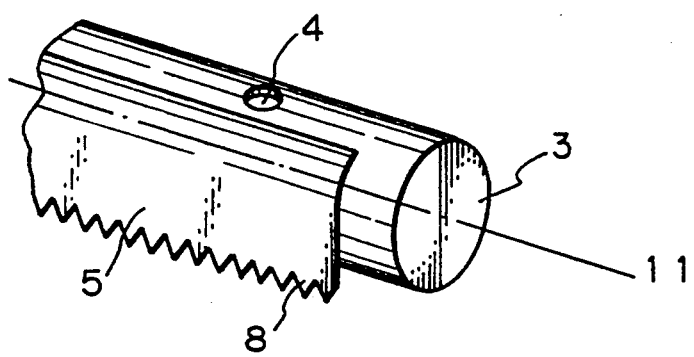

Hereunder, the present invention will be described referring to Examples.

FIGS. 1a through 1d show an embodiments of the liquid distributor of the present invention.

The liquid distributor according to one embodiment of the present invention comprises a longitudinal tube (1) to be provided in parallel to the longitudinal axis of the tower, a main tube (2) to be provided in parallel to the lateral axis of the tower, and distributing tubes (3) branched from the main tube.

Nozzle holes (4) are provided on the upper part of the distributing tubes (3) at optional intervals. The number of nozzle holes may vary. Along the side of the distributing tubes lower than the nozzle holes, a sheet-like material (5) is attached, the sheet-like material extending along the axis of the respective distributing tube. Here, it is not always a necessary requirement to fix the sheet-like material (5) on the part of the distributing tube lower than the nozzle holes; the sheet-like material (5) may be fixed on a part of the distributing tube above the nozzle holes and hung down over each side of the distributing tube, and holes are opened in the sheet-like material to correspond with the nozzle holes.

The lower end of the sheet-like material (5) does not come into contact with the distributing tube and is spaced apart from it. In addition, on the lower end of the sheet-like material (5), notches (8) are provided.

Figure 3:
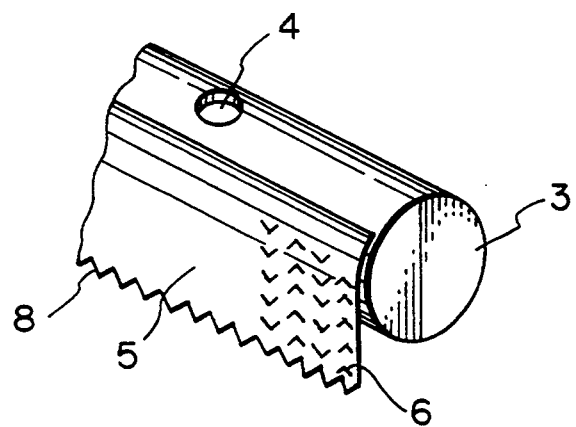
FIG. 3 is a perspective view of the distributing tube in the liquid distributor according to another embodiment of the present invention.

Projections and depressions (6) acting as a means for diffusing liquid may be formed on the surface of the sheet-like material (see FIG. 3). Alternatively, the sheet-like material may have many holes (7) provided together with or in place of the projections and depressions (6) acting as a means for diffusing liquid (see FIG. 4). Further, it is preferable to provide an oxide layer on the surface of the sheet-like material and/or the distributing tube by subjecting the material to a nitric acid treatment and the like, or subject it to satin finishing or provide fine flaws therein, to thereby improve wettability thereof by the liquid.

Explaining the flow of the liquid, the liquid to be distributed flows from the longitudinal tube (1) to the main tube (2) and is then branched from the main tube (2) into distributing tubes (3). The branched liquid flows out from the nozzle holes (4) of the distributing tubes (3). The liquid having flowed out falls downwardly spreading over the surface of the upper part of the respective distributing tube.

The distributing tube is preferably made from a round pipe, and in this case the face of the upper part of the pipe has a surface inclined along the vertical line. As a result, the liquid having flowed out from the nozzle holes which are provided on the upper part of the tube diffuses in a lateral direction as it falls downwardly along the surface of the round pipe.

The reason is as follows. When the liquid is flowed downwardly from the point on the upper part of the plate standing vertically, it flows in a straight line and thus tends not to diffuse on the plate. However, when the above operation is carried out on an inclined plate, the liquid easily diffuses in a lateral direction, and in an extreme case when the liquid falls upon a horizontal plate, it diffuses in all lateral directions.

Therefore, since the position of the nozzle hole is near the top of the distributing tube, the inclination of the surface of the tube at that position becomes larger, which is advantageous for the diffusion of the liquid.

Accordingly, it is preferable to provide the nozzle hole at the top of the pipe. Besides, the diffusion of the liquid can be further accelerated by using a square pipe as the distributing tube with the upper surface thereof being horizontal.

Figure 1C:
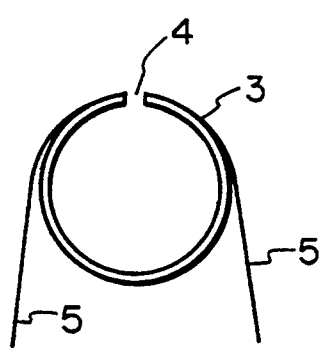
Figure 1D:
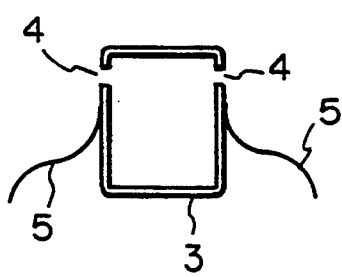

In the present invention, it is an essential requirement that "the side part of the distributing tube located at a position lower than the nozzle and/or the upper part of the sheet-like material have a surface which is inclined in a direction crossing with the axis of the distributing tube or is horizontal". Here, an embodiment satisfying the requirement that "the side part of the distributing tube located lower than the nozzle and/or the upper part of the sheet-like material have a surface which is inclined in a direction crossing with the axis of the distributing tube or is horizontal" includes the above-mentioned embodiment, namely, an embodiment in which the side of the distributing tube located lower than the nozzle is inclined such that a nozzle hole is opened on the top of a round pipe or the like (FIG. 1c). If this requirement is satisfied, the above-mentioned effects can be obtained and the diffusion of the liquid in a lateral direction is accelerated.

Figure 5:
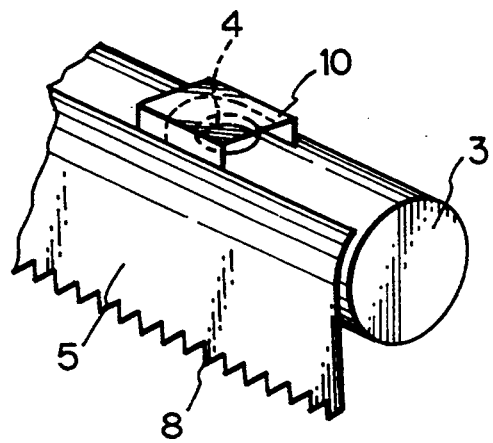
FIG. 5 is a perspective view of the distributing tube in the liquid distributor according to another embodiment of the present invention.

When the diameter of the nozzle is small and the head of the liquid is high, a flow velocity of the liquid becomes high, which may cause sprinkling of the liquid to the outside of the upper part of the distributing tube; in such a case, it is preferable to provide a cover (10) at the place opposing the nozzle hole (4) which covers the nozzle hole (see FIG. 5).

The liquid flowing out of the nozzle hole is supplied onto the sheet-like material extended along the side of the distributing tube lower than the nozzle hole. When the surface of the sheet-like material includes a part inclined to a vertical direction, the diffusion of the liquid is further accelerated. The liquid thus diffused in a lateral direction falls on the packing from the lower end of the sheet-like material.

It is preferable to provide the sheet-like material (5) on both sides of the distributing tube. By doing so, the liquid having flowed from the nozzle hole provided on the upper part of the distributing tube can be diffused while being divided into both sides. It is preferable also from this point of view that the nozzle hole is provided on the top of the distributing tube in practice. The sheet-like material to be fixed on the side part of the distributing tube may be constituted by one sheet-like material hung on the tube at the top thereof and pendant to both sides of the tube, or two sheet-like materials may be fixed on each side of the distributing tube.

On the surface of the sheet-like material, means for diffusing the liquid (6) may be provided (FIG. 3). The means for diffusing the liquid may be constructed by providing projections and depressions on the surface of the sheet-like material (FIG. 4), by opening a plurality of holes on the surface of the sheet-like material (FIG. 4), by corrugating the sheet-like material or by forming channels on the surface of the sheet-like material. In addition, the means for diffusing the liquid may be constructed by laminating the sheet-like material with a net-like material or by constructing the sheet-like material itself by a net.

The liquid flowing down the surface of the sheet-like material reaches the zigzag notches (8) provided on the lower end of the sheet-like material and falls down upon the packing from the crests of the notches towards the lower side. By virtue of this construction, the position from which the liquid falls down can be kept constant and thereby uniform distribution of the liquid can be effected.

The points of the zigzag notches may be round or sharp. Alternatively, a plate-like or stick-like material may be provided on the lower end of the sheet-like material at intervals.

In the case that only zigzag notches are formed on the lower end of the sheet-like material as above, when the amount of the flowing liquid is large, the liquid flows down not only from the points of the notches but also from the cracks of the notches, and as a result, the liquid runs down forming a liquid film. In addition, in case that the liquid is of strong surface tension, a liquid film is formed similarly. However, in this case, the film is not a uniform film and the liquid runs down with converging to several spots. According to the changes in the amount of the flow, the spots where the liquid converges are moved. As a result, the positions from which the liquid falls down are varied, which is undesirable from the viewpoint of the uniform distribution of the liquid. In order to prevent such a disadvantage, the zigzag notches on the lower end of the sheet-like material may be folded to both sides. By doing so, it is difficult for a liquid film to be formed.

Figure 7:
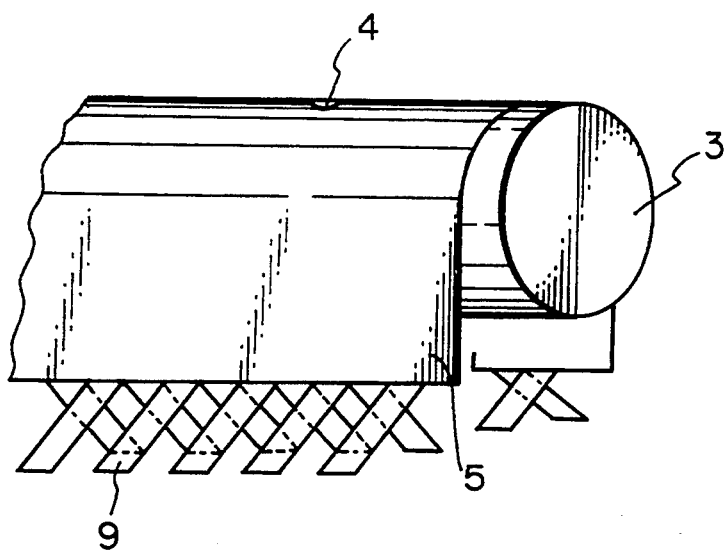
FIG. 7 is a perspective view of the distributing tube in the liquid distributor according to another embodiment of the present invention.

Further, in other more improved embodiments of the present invention, in order to dissolve the above disadvantage, liquid-ramifying plates (9) are provided in series on the lower end of the sheet-like material (5) and these plates are folded in opposite directions (FIG. 7).

As a result, the liquid running from the upper part down the surface of the sheet-like material is branched by ramifying plates, whereby the formation of a liquid film is inhibited and the liquid falls down from the tip of each ramifying plate. Besides, by providing these liquid-ramifying plates on the lower end of the sheet-like material, it becomes possible to distribute the liquid broadly in the region surrounded by the points of the liquid-ramifying plates, whereas the liquid is distributed linearly along the lower end of the sheet-like material in a case where such ramifying plates are not provided. As a result, further diffused distribution of the liquid can be effected.

Here, it is preferable that liquid-ramifying plates are placed at proper intervals. If adjacent liquid-ramifying plates are positioned close to each other, the formation of a liquid film tends to easily occur between adjacent ramifying plates even when these plates are opened, which is undesirable for the distribution of the liquid.

Moreover, the end of the liquid-ramifying plate may be fine. Adopting such a construction, the liquid is caused to fall continuously even when the amount of the flowing liquid is small.

It is preferable to enlarge the opening angle of the liquid-ramifying plate as the amount of the liquid to be distributed increases. This is because if the opening angle of the liquid-ramifying plate is small, a liquid film is easily formed. In practice, a preferable opening angle is of the order of 60° to 120°.

The liquid-ramifying plates may be opened in the opposite directions in series or a number at a time in the directions crossing with the axis of the distributing tube. The point of the liquid-ramifying plate may be round or sharp. In addition, the opened liquid guide plate may be crooked or flexed downwardly.

Liquid guide channels may be formed on the surface of the liquid-ramifying plate. Further, a hole with an optional size may be provided on the liquid-ramifying plate or the liquid-ramifying plate may be composed of a net-like material. In addition, the liquid-ramifying plate may be composed of a stick-like material or a needle-like material.

Moreover, instead of the liquid-ramifying plates, pendant components may be provided in series on the lower end of the sheet-like material with being opened to opposite directions one by one or several by several alternately. The same effects as mentioned above can be obtained by adopting such a constitution.

In conventional distributors of this kind, the interval between the distributing tubes is of the order of 10 cm and the interval between the nozzle holes is of the order of 10 cm. Therefore, the liquid has fallen on one spot per about 100 $cm^2$.

According to the present invention, even if the interval between the distributing tubes and that between the nozzle holes is the same as those of the conventional apparatus, the number of points which the liquid falls onto may be increased. Further, a remarkably large distribution can be effected by branching the liquid to both sides of the distributing tube.

In addition, as described above, in a conventional distributor in which nozzle holes are provided on the lower part of the distributing tube, uniform distribution of the liquid could not be effected in the case that the amount of the liquid is small. Whereas in the distributor of the present invention in which nozzle holes are provided on the upper part of the distributing tube, almost the same pressure can be obtained at any holes from the head in the longitudinal tube by maintaining the distributing tube to be nearly horizontal, and thereby uniform distribution can be accomplished even in case that the amount of the liquid is small.

As described above, the liquid distributor of the present invention may accomplish a uniform flow amount of the liquid from plural nozzle holes by locating the nozzle holes on the upper part of the distributing tube, and improve the distribution effects of the liquid and thereby accomplish uniform distribution of the liquid by providing inclined surface on which the liquid runs down and providing zigzag notches on the lower end of the sheet-like material.

Figure 2:
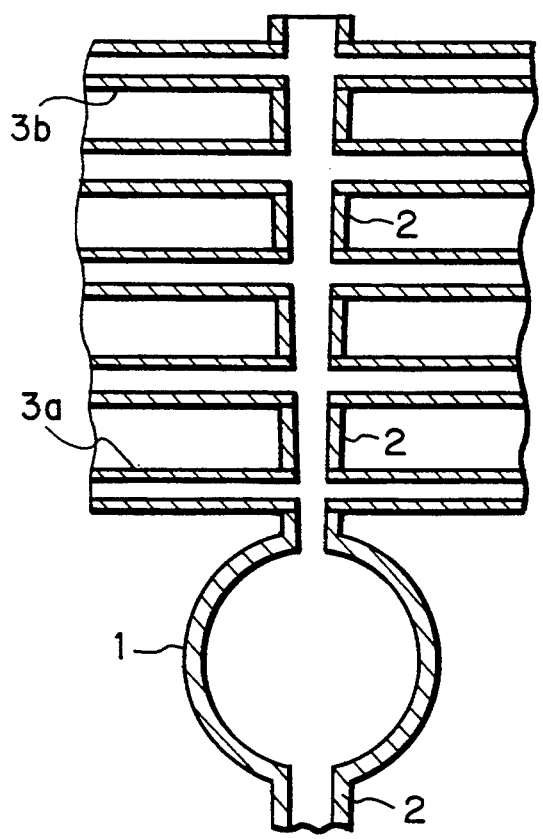
FIG. 2 is a cross-sectional view of the longitudinal tube, the main tube and the distributing tubes in the liquid distributor according to a preferred embodiment of the present invention.

In the liquid distributor according to the present invention, a plurality of distributing tubes (3) are connected to the main tube (2); in order that almost the same amount of the liquid is flowed to each of the distributing tube connected to the part of the main tube near the longitudinal tube (1) and that far from the longitudinal tube (1), it is preferable that the inside of the main tube is tapered as shown in FIG. 2 in such a manner that the diameter of the part of the main tube far from the longitudinal tube is larger than that near from the longitudinal tube. In FIG. 2, (3a) refers to a distributing tube connected to the part of the main tube near the longitudinal tube (1), and (3b) refers to a distributing tube connected to the part of the main tube far from the longitudinal tube (1). In FIG. 2 are omitted holes (4).

The size, the shape and the arrangement of the nozzle holes may be freely chosen.

Hereunder, various embodiments of the present invention will be described, referring to drawings.

In the liquid distributor of the present invention, projections and depressions (6) which act as means for diffusing the liquid may be provided on the surface of the sheet-like material, as shown in FIG. 3.

Figure 4:
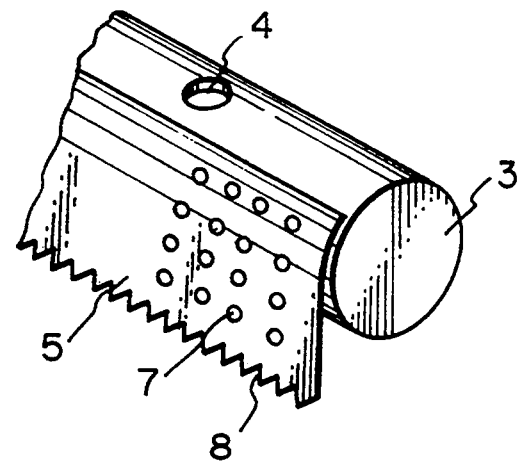
FIG. 4 is a perspective view of the distributing tube in the liquid distributor according to another embodiment of the present invention.

In addition, as shown in FIG. 4, a plurality of holes (7) which act as means for diffusing the liquid may be provided on the sheet-like material.

In addition, as shown in FIG. 5, a cover (10) may be fixed on the spot opposing the nozzle hole to prevent the liquid flowing out from the nozzle hole from being sprinkled to the outside.

Figure 6:
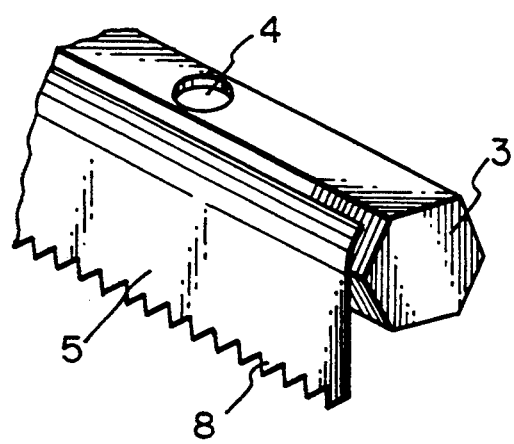
FIG. 6 is a perspective view of the distributing tube in the liquid distributor according to another embodiment of the present invention.

In the liquid distributor of the present invention, the distributing tube may be a trigonal or polygonal pipe, as shown in FIG. 6.

Further, as shown in FIG. 7, liquid-ramifying plates (9) may be provided on the lower end of the sheet-like material. The liquid-ramifying plates may be opened in opposite directions in series or a number at a time.

Figure 8:
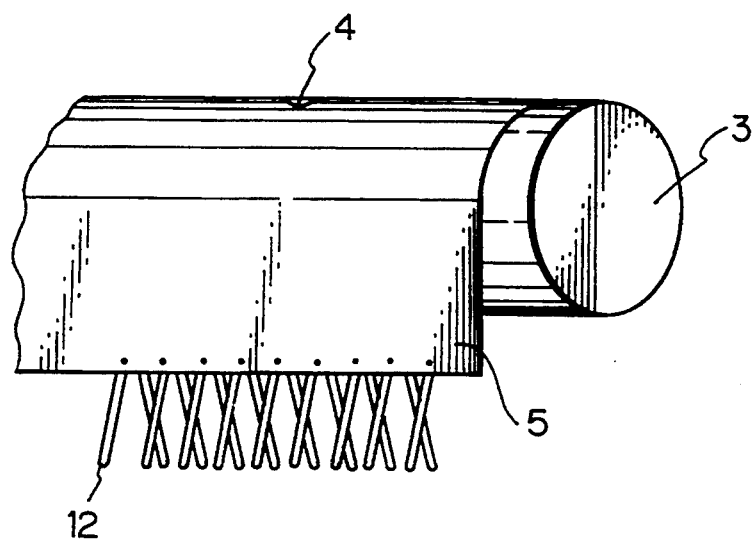
FIG. 8 is a perspective view of the distributing tube in the liquid distributor according to another embodiment of the present invention.

Moreover, as shown in FIG. 8, pendant components (12) may be provided on the lower end of the sheet-like material. The pendant components may be opened in opposite directions in series or a number at a time.

According to the distributing tube of the present invention, a liquid can be uniformly distributed to a packing mounted in the inside of a substance and/or heat exchanging tower.

What is claimed is:

1. A liquid distributor for use in a substance and/or heat exchanging tower, the liquid distributor comprising:
    a plurality of distributing tubes for distributing and supplying a liquid to be treated from an upper part of an inside portion of the tower to an area of the inside of said tower, said plurality of distributing tubes extending along a lateral axis of said tower, and said distributing tubes each having at least one nozzle hole provided on a top surface thereof; and
    a sheet-like material fixed on a surface of each of said distributing tubes at a position lower than said at least one nozzle hole such that said sheet-like material contacts the surface of said distributing tube and liquid discharges from said nozzle hole above said material;
    said sheet-like material extending in an axial direction of said distributing tube and said sheet-like material having a lower end which is spaced apart from the surface of said distributing tube; and
    said sheet-like material having zigzag notches formed on said lower end thereof; and
    wherein at least one of (i) a side part of said distributing tube located lower than said at least one nozzle hole and (ii) an upper part of said sheet-like material, having a surface which is inclined in a direction which is inclined relative to the axis of said distributing tube.

2. A liquid distributor according to claim 1, wherein said sheet-like material comprises projections and depressions on the surface of said sheet-like material, said projections and depressions serving as means for diffusing liquid.

3. A liquid distributor according to claim 1, wherein said sheet-like material comprises a plurality of holes formed therein, said holes serving as means for diffusing liquid.

4. A liquid distributor according to claim 1, further comprising a cover fixed at a position opposing a nozzle hole of a distributing tube for preventing liquid exiting from said nozzle hole from being sprinkled.

5. A liquid distributor according to claim 1, wherein said distributing tubes comprise a trigonal pipe.

6. A liquid distributor according to claim 1, wherein said distributing tubes comprise a polygonal pipe.

7. A liquid distributor according to claim 1, wherein the zigzag notches on the lower end of said sheet-like material are folded to opposite sides of the distributing tube.

8. A liquid distributor for use in a substance and/or heat exchanging tower, the liquid distributor comprising:
    a plurality of distributing tubes for distributing and supplying a liquid to be treated from an upper part of an inside portion of the tower to an area of the inside of said tower, said plurality of distributing tubes extending along a lateral axis of said tower, and said distributing tubes each having at least one nozzle hole provided on a top surface thereof; and
    a sheet-like material fixed on a surface of each of said distributing tubes at a position lower than said at least one nozzle hole such that said sheet-like material contacts the surface of said distributing tube and liquid discharges from said nozzle hole above said material;
    said sheet-like material extending in an axial direction of said distributing tube and said sheet-like material having a lower end which is spaced apart from the surface of said distributing tube; and said sheet-like material having liquid-ramifying plate members formed on said lower end thereof, said liquid-ramifying plate members being opened in opposite directions in series or a number at a time in a direction which is inclined relative to the axis of said distributing tube;

wherein at least one of (i) a side part of said distributing tube located lower than said at least one nozzle hole and (ii) an upper part of said sheet-like material, having a surface which is inclined in a direction which is inclined relative to the axis of said distributing tube.

9. A liquid distributor according to claim 8, wherein said sheet-like material comprises projections and depressions on the surface of said sheet-like material, said projections and depressions serving as means for diffusing liquid.

10. A liquid distributor according to claim 8, wherein said sheet-like material comprises a plurality of holes formed therein, said holes serving as means for diffusing liquid.

11. A liquid distributor according to claim 8, further comprising a cover fixed at a position opposing a nozzle hole of a distributing tube for preventing liquid exiting from said nozzle hole from being sprinkled.

12. A liquid distributor according to claim 8, wherein said distributing tubes comprise a trigonal pipe.

13. A liquid distributor according to claim 8, wherein said distributing tubes comprise a polygonal pipe.

14. A liquid distributor for use in a substance and/or heat exchanging tower, the liquid distributor comprising:

a plurality of distributing tubes for distributing and supplying a liquid to be treated from an upper part of an inside portion of the tower to an area of the inside of said tower, said plurality of distributing tubes extending along a lateral axis of said tower, and said distributing tubes each having at least one nozzle hole provided on a top surface thereof; and a sheet-like material fixed on a surface of each of said distributing tubes at a position lower than said at least one nozzle hole such that said sheet-like material contacts the surface of said distributing tube and liquid discharges from said nozzle hole above said material;

said sheet-like material extending in an axial direction of said distributing tube and said sheet-like material having a lower end which is spaced apart from the surface of said distributing tube; and said sheet-like material having pendant components formed on said lower end thereof in series, said pendant components being opened in opposite directions in series or a number at a time in a direction which is inclined relative to the axis of said distributing tube;

wherein at least one of (i) a side part of said distributing tube located lower than said at least one nozzle hole and (ii) an upper part of said sheet-like material, having a surface which is inclined in a direction which is inclined relative to the axis of said distributing tube.

15. A liquid distributor according to claim 14, wherein said sheet-like material comprises projections and depressions on the surface of said sheet-like material, said projections and depressions serving as means for diffusing liquid.

16. A liquid distributor according to claim 14, wherein said sheet-like material comprises a plurality of holes formed therein, said holes serving as means for diffusing liquid.

17. A liquid distributor according to claim 14, further comprising a cover fixed at a position opposing a nozzle hole of a distributing tube for preventing liquid exiting from said nozzle hole from being sprinkled.

18. A liquid distributor according to claim 14, wherein said distributing tubes comprise a trigonal pipe.

19. A liquid distributor according to claim 14, wherein said distributing tubes comprise a polygonal pipe.

* * * * *